Figure 3:
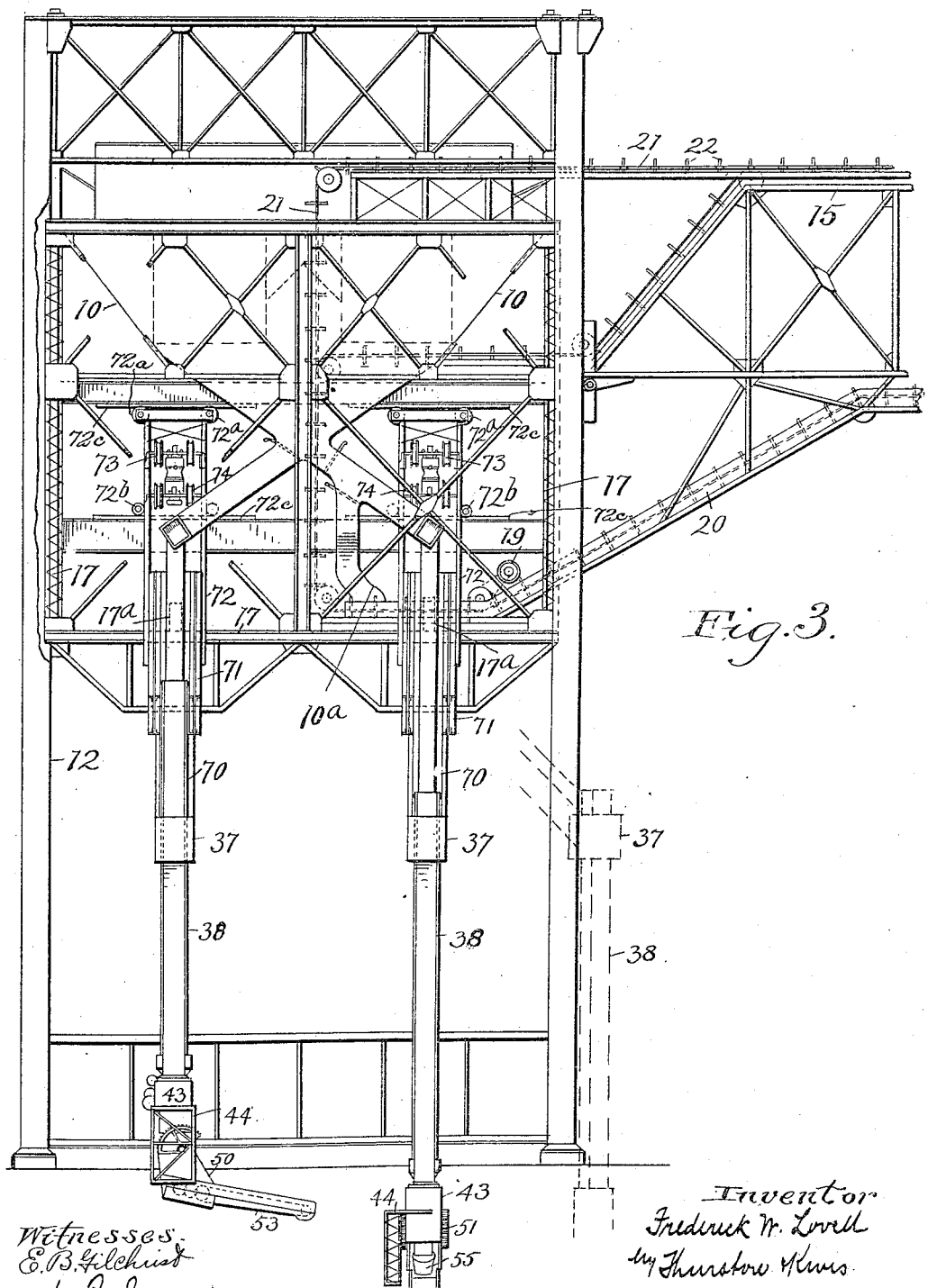

F. W. LOVELL.
APPARATUS FOR LOADING AND TRIMMING VESSELS.
APPLICATION FILED MAR. 25, 1912.
1,124,047.
Patented Jan. 5, 1915.
5 SHEETS—SHEET 1.
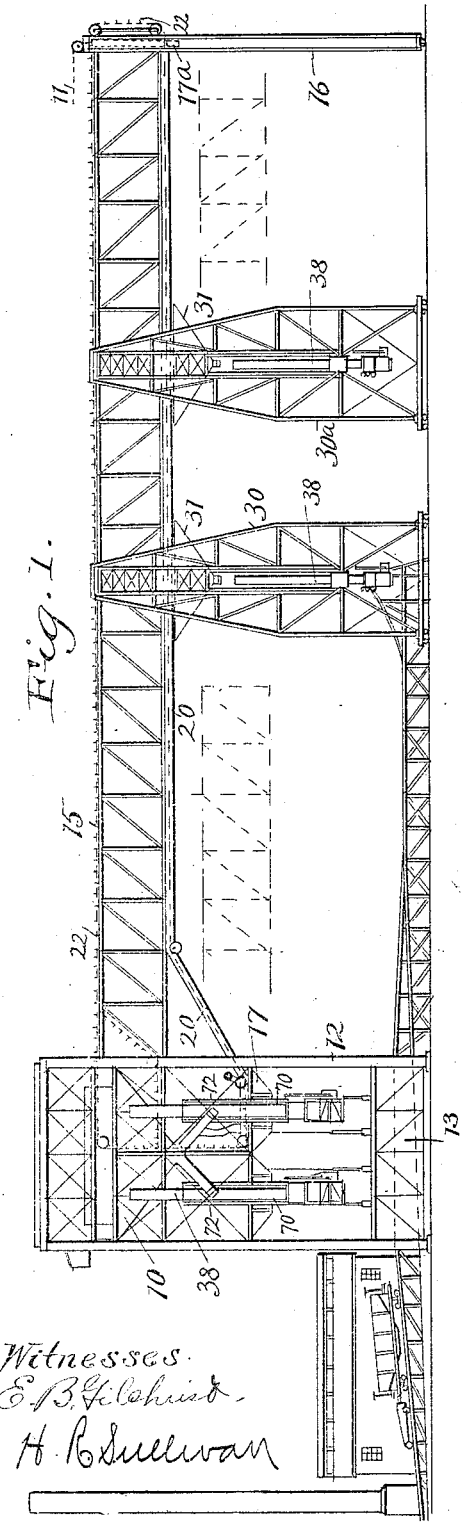
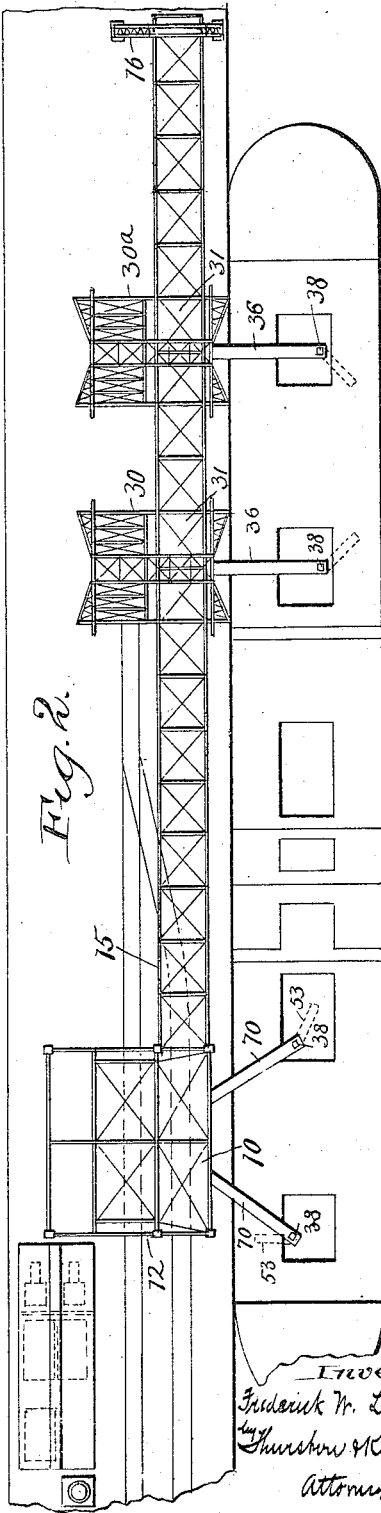

F. W. LOVELL.
APPARATUS FOR LOADING AND TRIMMING VESSELS.
APPLICATION FILED MAR. 25, 1912.

1,124,047.

Patented Jan. 5, 1915.
5 SHEETS—SHEET 2.

Witnesses
E. B. Gilchrist
H. P. Sullivan

Inventor
Frederick W. Lovell
by Thurston Knies
Attorney

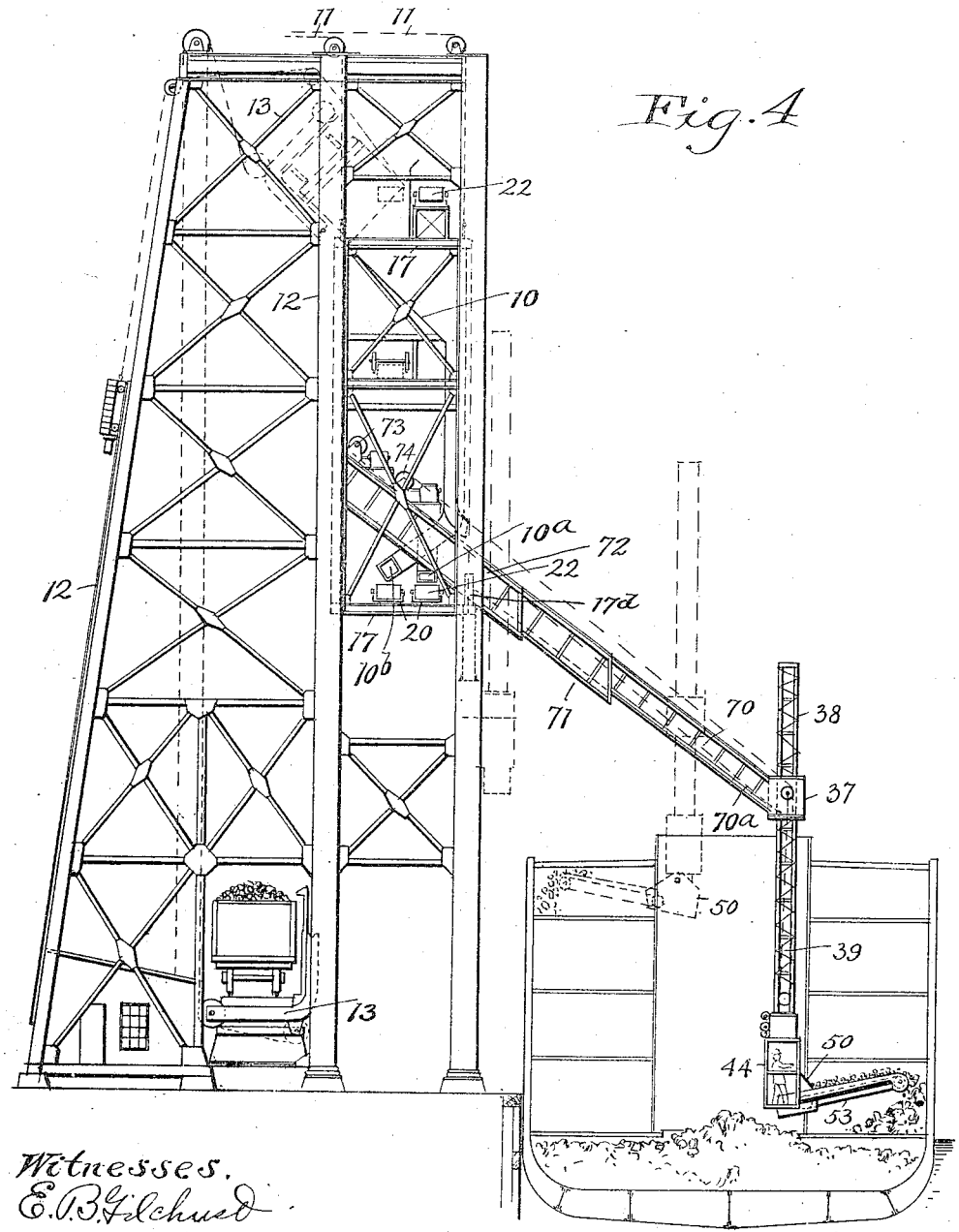

F. W. LOVELL.
APPARATUS FOR LOADING AND TRIMMING VESSELS.
APPLICATION FILED MAR. 25, 1912.
1,124,047.
Patented Jan. 5, 1915.
5 SHEETS—SHEET 4
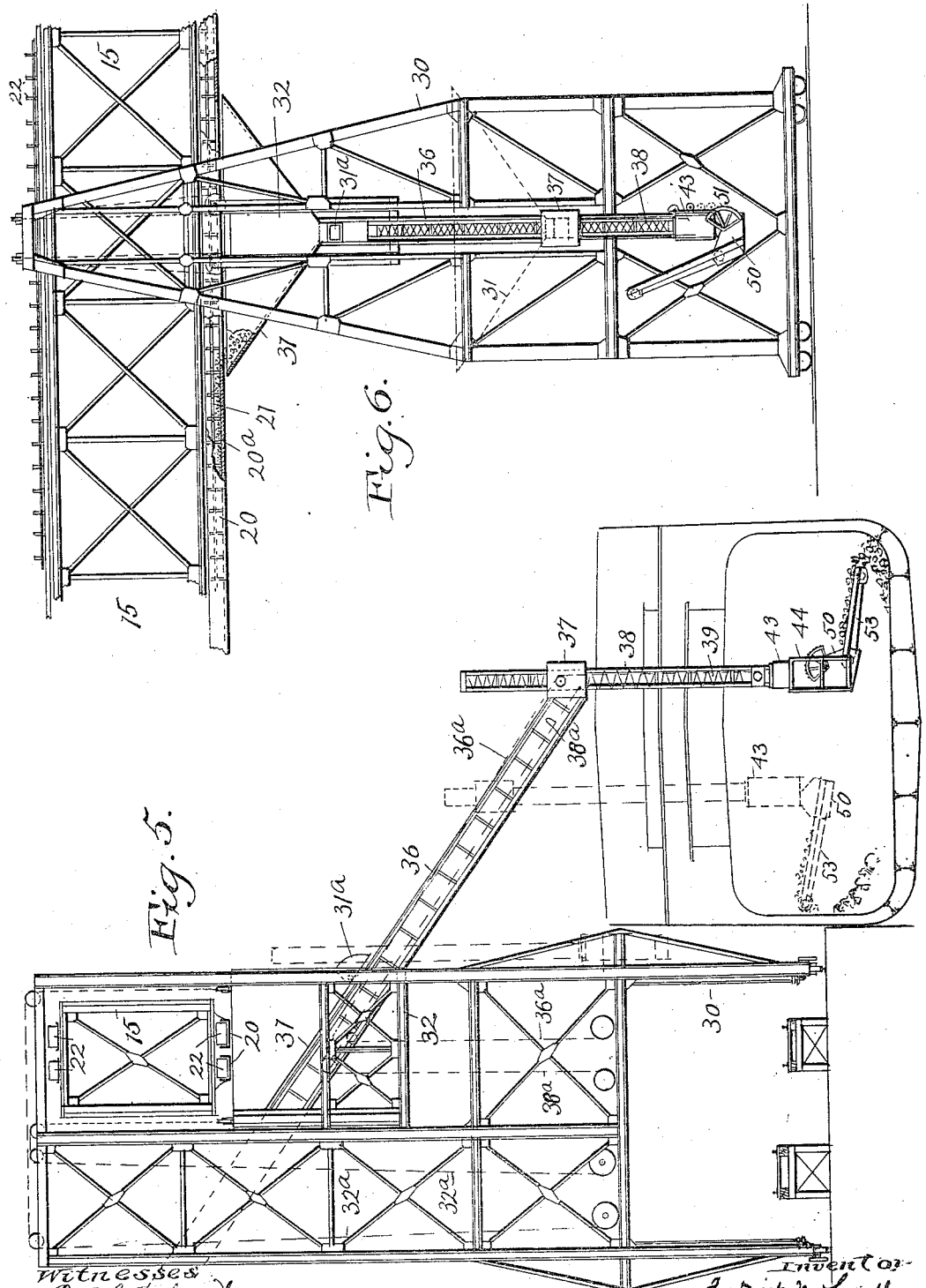

F. W. LOVELL.
APPARATUS FOR LOADING AND TRIMMING VESSELS.
APPLICATION FILED MAR. 25, 1912.
1,124,047.
Patented Jan. 5, 1915.
5 SHEETS—SHEET 5.
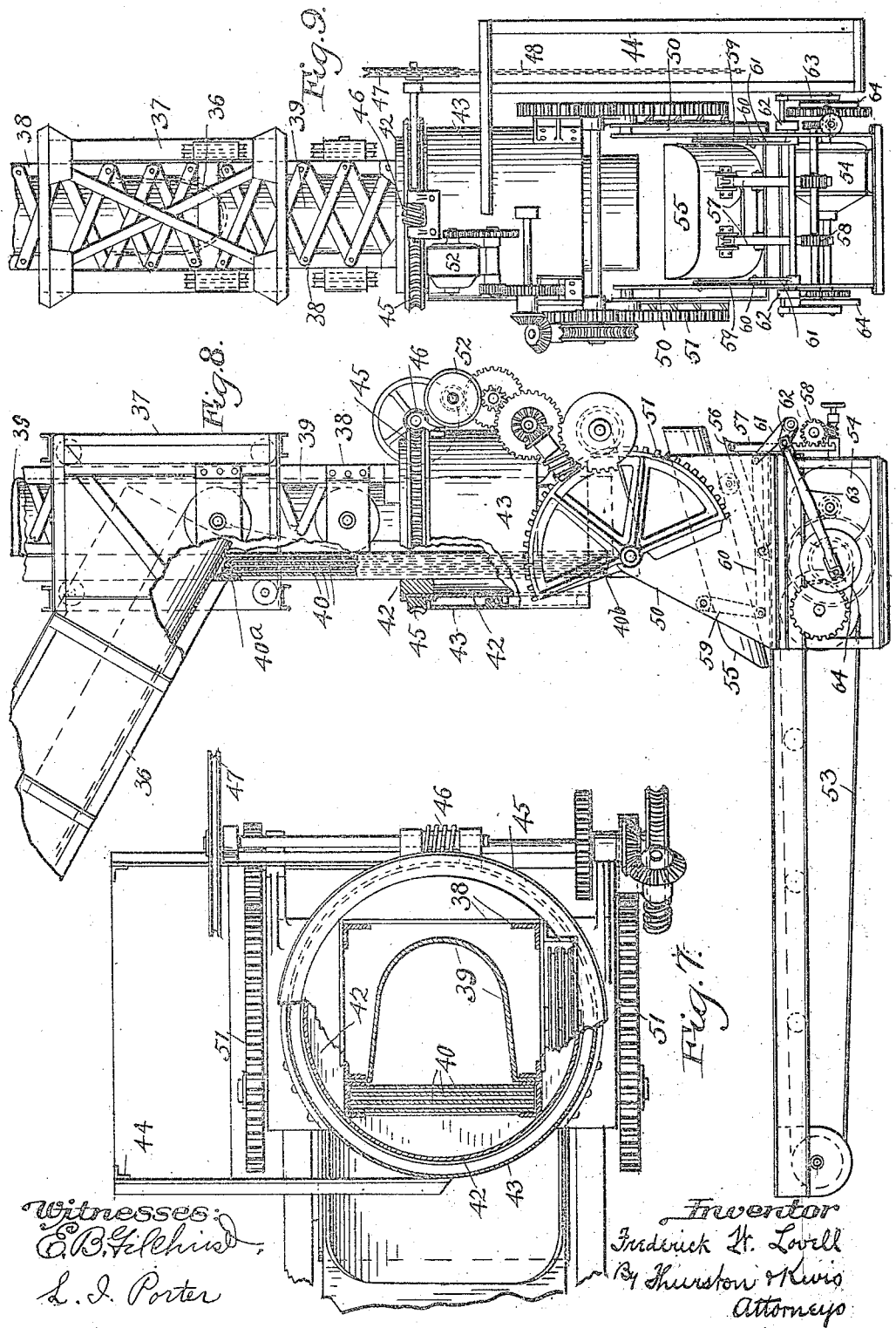

UNITED STATES PATENT OFFICE.

FREDERICK W. LOVELL, OF CLEVELAND, OHIO, ASSIGNOR TO THE McMYLER INTER-STATE COMPANY, OF CLEVELAND, OHIO, A CORPORATION OF OHIO.

APPARATUS FOR LOADING AND TRIMMING VESSELS.

1,124,047.  Specification of Letters Patent.  Patented Jan. 5, 1915.

Application filed March 25, 1912. Serial No. 685,970.

*To all whom it may concern:*

Be it known that I, FREDERICK W. LOVELL, a citizen of the United States, residing at Cleveland, in the county of Cuyahoga and State of Ohio, have invented a certain new and useful Improvement in Apparatus for Loading and Trimming Vessels, of which the following is a full, clear, and exact description.

This invention is intended to be used on docks for the purpose of quickly and economically transferring coal and analogous material from loaded coal cars into the holds of the vessels, and there properly disposing it for safe carriage.

The invention consists essentially of a traveling tower which carries chute mechanism comprising a member which is movable outward and inward on said tower to carry its outer end different distances away from said tower, a vertical tube supported by and vertically movable on the outer end of said member and placed to receive material conveyed to it by said member, and a trimming device on the lower end of said tube and adapted to receive material which flows down through said vertical tube and to discharge it therefrom in different directions, combined with mechanism for raising coal or other material and delivering it to the first mentioned member of the chute mechanism irrespective of the position of said tower, and mechanism on this tower for causing the required movements of the relatively movable part of said chute mechanism.

The invention includes numerous subordinate and adjunctive combinations of parts, all intended to increase the efficiency of the apparatus and coöperate in the performance of its functions.

In the embodiment of the invention which is shown in the drawing a loaded car is raised to any desired height by means of a car dumping machine of known construction. The tower of this car dumping machine supports a vertically adjustable hopper and one vertically adjustable end of a horizontal bridge. The other end of the bridge is correspondingly adjustable in a vertical direction. This bridge carries a conveyer arranged to receive material which may be discharged from said hopper. The tower which carries the chute mechanism is movable on tracks parallel with the bridge so that it may occupy any desired position between the ends thereof; and this tower carries a hopper which is arranged to receive the material discharged from the conveyer at any desired point between the ends of the bridge.

In the embodiment of the invention shown there are two conveyers carried by the bridge; and, obviously, there might be more if means were provided for selectively delivering the material from the hopper on the car dumping machine to said conveyers. There are also two movable towers,—it being desirable to have as many towers as there are conveyers.

The invention will be understood from the following detailed description of the particular embodiment of the invention shown, taken in connection with the appended claims, and with the accompanying drawings in which Figure 1 is a front elevation showing somewhat diagrammatically an apparatus embodying this invention. Fig. 2 is a plan view thereof upon the same scale. Fig. 3 is a front elevation on a large scale of the car dumping machine which forms a part of the apparatus. Fig. 4 is an end view on the same scale of the car dumping machine. Fig. 5 is an end view of one of the movable towers which forms a part of the apparatus. Fig. 6 is a front elevation of one of said movable towers. Fig. 7 is a sectional plan view of the vertical member of the chute apparatus. Fig. 8 is a side elevation thereof partly broken away. Fig. 9 is a front view thereof.

Referring to the parts by numerals, 10 represents the main hopper which is supported in an elevated position on the tower 12 of the car dumping machine. As stated, the car dumping part of this machine is of known construction, and any suitable mechanism may be employed which is capable of delivering coal to the hopper. The car dumping apparatus shown includes a cradle 13, adapted to receive a loaded car, and means by which said cradle may be raised to the required height, and tilted, and held on the cradle while tilted, so as to dump its load into said hopper.

15 represents a bridge of known construction which is supported at one end on the tower 12 of a car dumping machine, and at its other end by a suitable tower 16.

In the construction as shown there is a frame 17 which is vertically movable in guideways in the tower 12. The hopper 10, and the adjacent end of the bridge 15 are fixed to this frame. Another similar frame 17$^a$ which is indicated by dotted lines in Fig. 1 is movable up and down in the other tower 16; and the adjacent end of the bridge is fixed to it. Cables 11 which extend from suitable hoisting apparatus, preferably located adjacent to the car dumping machine, may pass over suitable guide sheaves and be secured to these frames whereby they may be raised or lowered and held in any required position. The vertical adjustability of these frames and bridge, and of other parts to be described, permits the apparatus to be adjusted for economical use in loading boats which set high or low in the water.

The bridge supports two conveyers. Each conveyer in the form shown, consists of a trough 20, which is downwardly deflected near the car dumping machine, so that it will lie beneath a spout through which material in the main hopper may be delivered into it. Since there are two conveyers there are necessarily two spouts, 10$^a$, 10$^b$, one for each conveyer.

In each trough is a traveling conveyer of suitable construction. In the form shown this consists of two endless side chains 21 having scraper blades 22 secured to them, by means of which the material delivered into the troughs may be moved along the same lengthwise of the bridge. The driving mechanism, which is shown conventionally at 19 (Fig. 3) for moving these scraper conveyers is mounted on the movable frame 17, and may be of any suitable construction.

The bottom of each trough is composed in whole or in part of plates 20$^a$ which are capable of being removed to make openings through which the material, being drawn along by the movable conveyer member, will drop through.

There are two towers 30 and 30$^a$ which are supported on tracks, along which they may be independently moved lengthwise of the bridge into any desired position relative thereto. These towers are alike in construction. Each carries a hopper 31. The hopper of one tower lies beneath one of the conveyer troughs, while the hopper of the other tower lies beneath the other conveyer trough.

In the construction shown, each tower contains a vertically movable guided frame 32 which is so constructed and arranged that the bridge passes over it. This frame is raised and lowered by suitable cables 32$^a$. The hopper 31 is secured to this frame, and when the bridge is moved up or down, these frames and hoppers are also moved correspondingly. Each of these hoppers 31 is associated with chute mechanism by which coal or other material discharged from the hopper will be led down through the hatchway of a vessel and discharged into the hold of a vessel and there properly trimmed.

This chute mechanism includes a long trough 36 which occupies an inclined position as shown, and which is supported upon the movable frame 32 wherein it is guided so that it may be moved endwise as required. Cables 36$^a$ fixed to the outer end of this trough lead over guide chains to winding drums supported on the tower. As these cables are wound upon these drums this trough will move lengthwise inward, and may assume the position shown by dotted lines in Fig. 5. The inclination of the trough is such that it will move out by gravity as far as the cables will permit. The hopper 31 is provided with a delivery spout 31$^a$ arranged over the associated conveyer so as to discharge onto the same.

At the outer end of the trough 36 a vertical housing 37 is placed, which serves as the guide for a vertically movable member 38. This latter member contains a U-shaped spout 39 disposed in vertical position with its open side toward the rear, so that the coal which slides down the trough 36 may be discharged into it. The rear open end of this spout 39 is closed below the trough 36 by a series of sliding plates 40 which lie side by side and are independently movable by gravity so as to always close the rear of said tube regardless of the position of the member 38. The upper plate is fixed to the member 36 and has at is lower edge a flange which projects into the path of a flange secured to the upper end of the next plate, which, in turn, has a flange at its lower end which lies in the path of a flange fixed to the upper end of the next plate. These plates at their lower edges rest on shoulders at the lower end of the guideways on which the plates move, wherfore the plates always move down by gravity to keep the rear end of the tube 39 closed, but can never move past one another as to leave an opening. These upper flanges are indicated by 40$^a$ and the lower flanges by 40$^b$.

Properly reeved cables 38$^a$ fixed to the member 38 and extending over guide sheaves, then up along trough 36, go to suitable winding drums by means of which the vertical member 38 may be raised or allowed to move down as required.

On the lower end of the member 38 is a load trimmer which, in the form shown, is of the following construction. A sleeve 42 is fixed to the lower end of the member 38. An outer sleeve 43 is mounted upon this inner sleeve so as to be capable of rotating about a vertical axis. This sleeve 43 supports a cage 44 in which the operator may stand. There is a worm gear 45 fixed to the sleeve 42; and a worm 46 which engages with said worm gear is mounted on the sleeve 43,—said worm having a sheave 47 secured to it. An endless chain 48 runs over this sheave down to the operator in the cage, so that he may, by pulling on one leg or the other of the chain, turn the worm and consequently cause the sleeve 43 to turn.

A conveyer frame 50 is pivoted on a horizontal axis to the sleeve; mechanism is provided for tilting this frame on its axis to any desired angle. This mechanism may consist of a gear segment 51 fixed to each side of the frame, an electric motor 52 carried by the sleeve 43, and suitable trains of gearing intermediate of said motor and gear segments.

The frame 50 carries a belt conveyer 53 of familiar form; and also carried an electric motor 54 and suitable intermediate mechanism for operating it. There is a regulating feed device in the form of a trough 55 located beneath the tube 39 so that the material falling down through said tube will drop into this trough. This trough is supported at its front end on swinging arms 59, and it inclines upward toward its rear end which has rollers which rest and ride on the inclined plate 56, on to which it discharges. This plate is pivoted at its front end; and its rear end is connected with two vertically movable rack bars 57. These can be moved up and down by pinions 58 and thereby the inclination of the plate and the trough 56 may be varied. The trough is vibrated backward and forward by any suitable mechanism, as, for example, link 60, a rock shaft having two arms 61, 62, to one of which link 60 is connected, while the other arm is connected by connecting rod 63 with a crank 64. By vibrating this trough the coal which falls into it from tube 38 is delivered slowly onto the conveyer belt. By varying the inclination of this tube the rate of discharge is varied.

The car dumping machine, as shown, is provided with two chutes and coal delivery mechanism which are like those decribed as mounted on the towers 30 and 30ª, with the exception that the trough 70, which corresponds with the trough 36, is movably mounted in a downwardly inclined member 71 which in turn is movably mounted in a saddle 72 which is supported by the frame 17, being mounted on a vertical axis 17ᵈ carried thereby. The rear end of this saddle has two sets of wheels 72ª, 72ᵇ which engage with fixed tracks 72ᶜ which reinforce the pivot and take strain therefrom. The cable for telescoping these members is secured to the outer end of the trough 70 and goes over guide sheaves to winding drums 73, so that when said cable is taken in, the trough 70 will move up in the member 71 as far as it can, and then said member 71 and trough will move together in the saddle 72 until the vertical member is close to the front part of the tower of the car dumping machine.

It is to be understood that the apparatus above described is to be erected on a dock with the bridge parallel to the dock face. The vessel to be loaded is tied up to the dock, and the hatches are uncovered. Then the chute mechanisms for the car dumping machine are swung on the pivot of the saddle 72 so that when the chute members are allowed to run out the vertical members 38 will be over the desired hatches, and may be lowered through them. The two towers 30 and 30ª are moved along to the desired position relative to the vessel, and their chute mechanisms are in like manner passed down through the proper hatchways. Then as coal is delivered into the main hopper 10, it is allowed to run out of the spouts thereof, of which four will be provided,— two of which deliver into the two troughs 70 of the car dumping machine, while the other two discharge into the two conveyers which drag the material along the conveyer trough and discharge it into the hoppers on the two towers. It will be discharged from these hoppers into the chute mechanism associated therewith, and led down to and discharged into the hold of the vessel. An operator in each cage will have close at hand levers controlling the operation of the various motors which control the operation of the various parts of the chute mechanism, and he may thereby cause the same to be drawn in or run out as required, may cause the vertical member 38 to be raised or lowered as required, may cause the sleeve 43 to be turned as required, may cause the frame 50 to be tilted as required so that the coal or other material may be discharged into the hold of the vessel in such manner as to be well trimmed for safe carriage. In other words he has complete control of the mechanisms associated with his particular cage, and may thereby cause the coal to be delivered at any point he desires, within the range of operation of the mechanism which he controls.

Having thus described my invention, I claim:

1. In an apparatus for loading and trimming vessels, the combination of a car dumping machine, a bridge having a trough shaped floor which is provided with a plurality of removable bottom sections, a hopper arranged to receive the material discharged from cars when they are lifted and dumped by the car dumping machine and to deliver said material into said trough, a conveyer adapted to drag material along the floor of the trough, a tower movable in a path parallel with said bridge, whereby said tower may be brought into the desired relation with any removable section of the floor of the bridge trough, a hopper carried by said tower in a position to receive material discharged through an opening in the floor of the bridge trough, and chute mechanism for conveying material discharged from the last mentioned hopper into the hold of the vessel.

2. In an apparatus for loading and trimming vessels, the combination of a car dumping machine, a bridge having a trough shaped floor which is provided with a plurality of removable bottom sections, a hopper arranged to receive the material discharged from cars when they are lifted and dumped by the car dumping machine and to deliver said material into said trough, a conveyer adapted to drag material along the floor of the trough, a tower movable in a path parallel with said bridge whereby said tower may be brought into the desired relation with any removable section of the floor of the bridge trough, a hopper carried by said tower in a position to receive material discharged through an opening in the floor of the bridge trough, chute mechanism for conveying material discharged from the last mentioned hopper into the hold of the vessel, and mechanisms for correspondingly changing the elevation of the bridge and the hoppers on the car dumping machine and tower.

3. In an apparatus for loading and trimming vessels comprising a tower which is movable lengthwise of the dock so as to be adjacent to any desired hatchway of a vessel tied to said dock, an elevated hopper carried by said tower, conveyer mechanism for delivering coal or other material into said hopper, regardless of the position of the tower and chute mechanism carried by said tower, and comprising a member whose inner portion will always be in position to receive material discharged from said hopper, but which is movable outward and inward on the tower to carry its outer end over different parts of the selected hatch of a vessel, a vertical tubular member carried by the first named member at the outer end thereof and capable of being moved up and down to carry its lower end through the hatch and into the hold of the vessel to any desired level, and trimmer mechanism on the lower end of said vertical tubular member which is placed so that it receives the material flowing down through said tubular member and is adapted to discharge said material in different directions therefrom into the hold of the vessel, combined with mechanism carried by said tower for imparting to the parts of the chute mechanism the stated relative movements, said chute mechanism and hopper being connected together, and means by which said connected parts may be raised and lowered as a unit, and mechanism for independently raising the conveyer to preserve its relation with the hopper.

4. An apparatus for loading and trimming vessels comprising a bridge and means by which the same may be raised and lowered, a hopper connected with said bridge and movable up and down with it, means for discharging coal or other material into said hopper, conveyer mechanism carried by the bridge and arranged to receive material discharged from said hopper and to discharge it at any point along the bridge, a tower movable lengthwise of the bridge, a hopper fixed to said tower and arranged to receive material from the conveyer, and chute mechanism arranged to receive material from the last mentioned hopper and to convey it down and discharge into the hold of a vessel, and mechanism for raising and lowering on the movable tower the chute mechanism and hopper carried thereby.

In testimony whereof, I hereunto affix my signature in the presence of two witnesses.

FREDERICK W. LOVELL.

Witnesses:
H. R. SULLIVAN,
E. L. THURSTON.